2,656,855

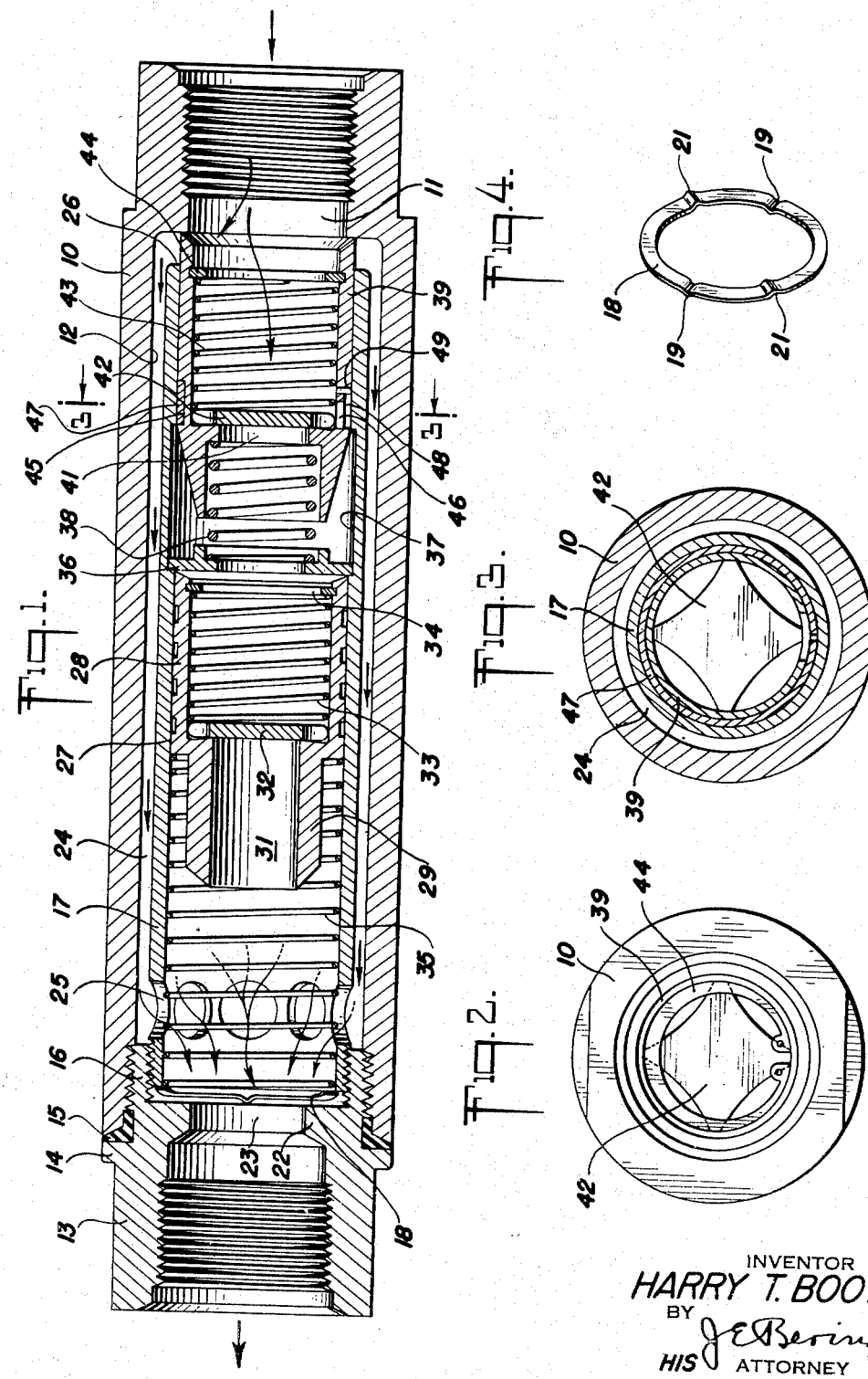
Oct. 27, 1953 — H. T. BOOTH — 2,656,855
AUTOMATIC CUTOFF DEVICE
Filed April 11, 1950
INVENTOR
HARRY T. BOOTH
BY J. E. Beringer
HIS ATTORNEY Patented Oct. 27, 1953

UNITED STATES PATENT OFFICE 2,656,855

AUTOMATIC CUTOFF DEVICE

Harry T. Booth, Dayton, Ohio, assignor to United Aircraft Products, Inc., Dayton, Ohio, a corporation of Ohio Application April 11, 1950, Serial No. 155,231

7 Claims. (Cl. 137—620)

This invention relates to automatic cut off devices for the protection of hydraulic lines and systems, particularly as used in aircraft to avoid complete loss of the hydraulic fluid when it is endeavored to operate the landing gear, wing flap or the like in the presence of a leak in the line.

The function of devices of this kind is to shut off liquid flow soon after a predetermined total quantity has passed through it, the assumption being that flow in excess of a predetermined quantity is due to leakage loss, and, therefore, the flow should be shut off to prevent any greater loss. For example, if in an airplane hydraulic system, a line is supplying a cylinder of 200 cubic inches total displacement volume, in the absence of a leak no more than 200 cubic inches of hydraulic fluid can pass through the supply line. A greater quantity flow indicates leakage. An automatic cut off device in such a line will be set to pass 200 cubic inches and to interrupt flow at some higher value, say 205 cubic inches. In the event of damage to the system, therefore, the gross loss of fluid will not exceed 205 cubic inches. Without the protection afforded by the automatic cut off device, the entire supply of hydraulic fluid might be drained before the pilot or flight engineer became aware of misoperation.

The instant invention contemplates an improvement in devices of the class described in that their operation is made independent of variations in rate of flow through the hydraulic supply line. Prior art devices have such independence above a predetermined minimum rate of flow, but this minimum is undesirably high. Current air force specifications on the cut off devices require detection and response to a leak at a flow rate of only one-tenth of a gallon per minute. Moreover, in prior art devices, the minimum operative flow rate is variable, being a function of the force rate of a spring which opposes movement of the cut off valve to closed position. The force rate of this spring is calculated with regard to the pull of gravity, it being necessary that the spring withstand some given multiple of the force of gravity to avoid inadvertent or premature closing of the valve.

In brief, the limitation of the prior devices as to flow rate has arisen from a conception of operation in which the valve closing force is derived from a created pressure drop which varies directly with variations in rate of flow. Accordingly, at a flow rate which is too low to establish a pressure drop of sufficient value to overcome the resistance of the described spring the device is unresponsive to excess quantity flow.

In contrast, it is proposed in the present instance to create a pressure drop for operation of the valve which is substantially independent of flow rate and which may be initially fixed with respect to the force rate of the opposing spring.

It is further proposed to introduce a new element of adjustability in the device whereby selective modes of operation may be had at low flow rates. In a first mode of operation, the motion of the valve toward closed position will, in a curve, appear as a straight line against flow rate increasing and decreasing relatively to a zero value. In a second mode of operation, the line of motion of the valve inclines sharply as zero flow is approached, indicating that the valve can move to closed position with no flow taking place beyond the device except that displaced by the valve. In a third mode of operation the curve declines sharply, indicating that flow is taking place through the device without a corresponding movement of the valve.

Other objects and structural details of the invention will appear from the following description when read in connection with the accompanying drawing, wherein:

Fig. 1 is a view in longitudinal section of an automatic cut off device in accordance with the instant invention;

Fig. 2 is a front end view of the device;

Fig. 3 is a view in cross section taken substantially along the line 3—3 of Fig. 1; and Fig. 4 is a detail view, in perspective of a lock washer comprised in the device.

Referring to the drawing, in its illustrative embodiment, the automatic cut off device comprises a cylindrical body 10 to be inserted in a fluid flowing line, for example, one extending from a source of hydraulic pressure fluid to a reciprocating hydraulic motor operating landing gear, wing flaps or the like. In such a line flow takes place in alternate directions. Return flow to the pressure fluid source offers no opportunity for excessive loss of fluid. Accordingly, the automatic cut off device functions only during the opposite direction of flow, i. e., from the source to the motor.

The body 10 presents a longitudinal bore 11 and a counterbore 12. At one end of the body the bore 11 is internally threaded to receive a pipe coupling or the like. A closure 13 at the opposite end of the body is similarly internally threaded. In the installation of the device, the body 10 is arranged so that outward flow, from the source, is in the direction indicated by the arrows in Fig. 1.

The closure 13 has a circumferential shoulder 14 to abut the end of body 10 through a seal 15, and further is formed with a cylindrical projection 16 received in the counterbore 12. The projection 16 is externally threaded whereby the closure 13 may be screwed into the body 10 and is internally threaded whereby adjustably to receive and mount a cylinder 17. A resilient lock washer 18, having opposed sets of prongs 19 and 21, is interposed between the end of cylinder 17 and a transverse wall 22 formed integrally with the closure 13 and defining the bottom of cylindrical projection 16. The lock washer 18 maintains an axial thrust pressure upon the cylinder 17 resisting rotation thereof out of a selected position of adjustment.

The wall 22 has a large axial opening 23. Cylinder 17 is spaced from the body 10 and defines therewith an annular passage 24. The passage 24 communicates with opening 23 by way of a series of radial ports 25 formed in the cylinder 17 adjacent the end thereof. The opposite end of the cylinder 17 terminates short of contact with the bottom of counterbore 12 and so defines an opening 26 through which the passage 24 may communicate with bore 11. Accordingly, fluid entering body 10 by way of bore 11 may pass through opening 26 and flow outward along passage 24 and thence through ports 25 to the interior of cylinder 17 and out of the body by way of opening 23. The areas of passage 24 and of ports 25 are approximately equal so that there is no material or relative restriction of flow between opening 26 and opening 23. The area of opening 26 is varied in a manner and for a purpose to be described.

Slidably mounted in the cylinder 17 is a piston valve assembly 27 comprising a hollow cylindrical body portion 28 and a projecting tapered nose portion 29 presenting a through bore 31. Further comprised in the assembly 27 is a check valve 32 arranged to seat in the bottom of body portion 28 and close bore 31 to fluid flowing outward or in a liftward direction as viewed in Fig. 1. A light spring 33 based on a snap ring 34 mounted in body portion 28 urges the valve 32 to seated position. The body portion 28 of assembly 27 has a sliding, fluid tight contact with the wall of cylinder 17. The nose portion 29 is axially aligned with opening 23 in such wise that the tapered end thereof may enter and seat in that opening. Since the seat so provided is beyond ports 25, closure of the valve as described is effective to interrupt flow through passage 24 and opening 23 out of the device.

The piston valve assembly 27 tends normally to assume the open position illustrated by reason of force exerted by a compression spring 35 based on the spring washer 18 and bearing on body portion 28. The force rate built into spring 35 bears a determined relation to the pull of gravity, being designed to hold the valve open against a predetermined multiple of gravity force in order that the action of the valve will not be affected by the speed and maneuvers of the aircraft.

Under influence of the spring 35, the piston valve occupies a position of limit against a centrally apertured disc 36 held in one end of an annular cylinder groove 37 by a strong spring 38, the disc 36 being elliptical in shape so that it may be installed in the groove 37 by endwise insertion through the cylinder 17. The other end of the strong spring 38 bears upon a control piston 39 slidably mounted in the cylinder 17 and arranged to seat on the bottom of counterbore 12 in a position closing opening 26 from communication with bore 11. That end of piston 39 engaging the bottom of counterbore 12 is open and in surrounding relation to the bore 11. The opposite end thereof presents an opening 41 controlled by a check valve 42 closing in the same direction as the check valve 32 and similarly controlled by a light spring 43 based on a snap ring 44.

The piston 39 further presents a peripheral groove 45 occupying a determined relation to the inward or right hand edge of groove 37 in the normal or seated position of piston 39. Cut in the groove 45 is a narrow, longitudinal slot 46. A split band or collar 47 is seated in the groove 45. The split portion thereof defines an opening 48 which by rotary adjustment of the collar is caused to register with the slot 46. A pin 49 passed through the collar 47 and the wall of groove 45 rearwardly of slot 45 holds the collar and piston 39 against relative rotary motion. The slot 46 and opening 48 cooperate to define an orifice (hereinafter called orifice 48), the open area of which is variable by reciprocation of the piston 39 extending and retracting the orifice with respect to the edge of groove 37. It will be understood that the initial position of orifice 48 with regard to the edge of groove 37 is determined by the position of axial adjustment of the cylinder 17. The arrangement may be such that the orifice 48 is normally closed but begins to open immediately that piston 39 leaves its seat on the bottom of counterbore 12. This is the illustrated arrangement of the parts. Should the cylinder 17 be advanced slightly, the orifice 48 will be normally closed and will begin to open at a later point in the extension of the piston 39. Retraction of the cylinder 17 from the position shown will provide the orifice 48 with a normally open area. It will also be understood that the piston 39 is displaceable by flowing fluid entering bore 11.

The piston 39 further acts to vary the area of opening 26 which thus becomes a second orifice, the construction and arrangement being such that the ratio of flow through the two orifices is substantially constant.

In the operation of the device, the parts at rest occupy the positions shown. Upon admission of fluid to bore 11, the control piston 39 is displaced axially outward, opening orifice 26 an amount proportionate to the rate of flow and opening orifice 48 a corresponding amount. The fluid flow will accordingly be divided into two streams, the larger one of which goes through orifice 26 to passage 24 and thence out of the device by way of ports 25 and opening 23. The smaller stream passes out orifice 48 and into the cylinder 17 in back of piston valve 27, displacing the piston in a direction to seat nose 29 in opening 23. The quantity flow in the two streams bears such relation one to another that the quantity required for operation of the hydraulic motor will have passed through the device before valve nose 29 reaches opening 23. In the absence of leaks beyond the cut off devices, therefore, fluid flow will cease without action on the part of piston valve 27 which will then tend to return to normal position under the urging of spring 35. In the return flow operation, the fluid enters opening 23 and reaches bore 11 by direct flow through the check valve controlled openings in piston valve 27 and control piston 39, the piston valve and control piston being at the same time reset to their normal or starting positions. In the event of leakage beyond the cut off device, outward flow will continue until the piston valve 27 reaches and closes opening 23.

The orifice 26 creates a pressure drop in the line, which, since it is applied across the piston valve 27, embodies a closing force thereon. Were this orifice fixed in area such pressure drop would vary directly with variations in rate of flow. Proper operation of the device would under these circumstances depend upon the maintenance of a sufficiently rapid rate of flow to create a pressure drop adequate to overcome the spring 35. A rate of flow below the critical value would result in no operation of the piston valve, all of the flow being passed through orifice 26. In the instant invention, however, the area of orifice 26, and, of course, orifice 48, is variable with flow rate. As a result the pressure drop is substantially independent of flow rate which can descend to any value without altering the constant flow ratio as between the orifices 26 and 48. An adequate pressure in the system is assumed. In this connection, spring 38, which resists opening movement of the control piston 39, is selected with regard to the force rate of spring 35 so that the minimum pressure difference required for outward movement of piston 39 is sufficient to overcome the spring 35.

The feature of adjustability of the cylinder 17 relative to the orifice 48 offers a number of possibilities for modified operation of the device. Thus if the orifices 26 and 48 are made to open and close simultaneously, the flow will always be divided in proportion between the two orifices. Should orifice 48 open ahead of orifice 26, or stand normally open, a condition of low flow rate in the presence of a leak will enable piston valve 27 to travel and close opening 23 without flow taking place through orifice 26. In an adjustment of the parts providing for opening of the orifice 26 ahead of the orifice 48, the result is to set a minimum flow rate for operation of the device. Thus for flow rates above a predetermined minimum the ratio of flow through the orifices will be constant. Below the minimum value, orifice 48 will be closed and all flow will pass through orifice 26.

What is claimed is:

1. An automatic cut off device for fluid flowing lines, comprising a normally open valve displaceable by flowing fluid toward a closed position interrupting flow in the line, means for dividing the flow in said line into primary and secondary streams, the latter acting on said valve, control orifices for each of said streams, and fluid flow displaceable means for varying the area of said orifices in correspondence with one another and in correspondence with variations in the rate of flow of the hydraulic fluid.

2. An automatic cut off device for fluid flowing lines, comprising a normally open valve displaceable by flowing fluid toward a closed position interrupting flow in the line, means for dividing the flow in said line into primary and secondary streams, the latter acting on said valve, control orifices for each of said streams, fluid flow displaceable means for varying the areas of said orifices according to a constant ratio, and a spring acting on said displaceable means to create a pressure drop for operation of said valve which is substantially independent of fluid flow rate.

3. An automatic cut off device for fluid flowing lines, comprising a normally open valve displaceable by fluid flow toward closed position; spring means for holding said valve against movement under a predetermined multiple of the pull of gravity; a pair of orifices in parallel relation in advance of said valve, part of the flowing fluid passing through one of said orifices to displace said valve and the remainder of the fluid passing through the other of said orifices to a point beyond said valve, flow displaceable means for varying the areas of said orifices, and a spring load on said means of a value to create a pressure drop sufficient to overcome said spring at any rate of fluid flow in said line.

4. An automatic cut off device for fluid flowing lines, comprising a body presenting a through bore, a valve seat at one end of said bore and a longitudinal passage communicating at its one end with said bore in advance of said valve seat; means defining a first orifice communicating the opposite end of said passage with the other end of said bore; a piston valve in said bore displaceable by fluid flow toward said valve seat, said orifice providing a pressure drop to embody a closing force upon said valve under the admission of fluid through said other end of the bore, a second orifice between said other end of the bore and said piston valve to pass a part of the admitted fluid to said piston valve, said part bearing a predetermined quantity relation to the larger part flowing through said passage, and an area control device for said orifices spring loaded in a direction opposed to the direction of flow of the admitted fluid.

5. An automatic cut off device according to claim 4, characterized by check valves in said piston valve and in said device for return flow of the fluid through said bore.

6. An automatic cut off device for fluid flowing lines, comprising a body presenting a valve seat and a passage leading to said valve seat, a normally open valve displaceable by flowing fluid toward engagement with said seat to cut off flow through said passage, a pair of orifices arranged in parallel to divide incoming fluid into a main stream directed through said passage and a supplemental stream directed to said valve to effect movement thereof, a fluid flow displaceable area control device for said orifices, and a spring load on said device to create a pressure drop for actuation of said valve which is substantially independent of variations in the rate of fluid flow.

7. In a device of the class described, a body presenting a longitudinal bore, a piston slidable in said bore, a passage communicating with said bore at the ends thereof on opposite sides of said piston, a pressure fluid inlet at one end of said bore, a fluid flow displaceable device for varying the rate of admission of fluid to said passage in correspondence with the rate of flow of the fluid, and an orifice between said one end of the bore and said piston controlled by said device to vary the rate of flow to said piston with variations in the rate of admission to said passage.

HARRY T. BOOTH.

References Cited in the file of this patent

UNITED STATES PATENTS

| Number | Name | Date |
|---|---|---|
| 1,372,915 | Smith | Mar. 29, 1921 |
| 2,354,161 | Waterman | July 18, 1944 |
| 2,512,190 | Waterman | June 20, 1950 |
| 2,555,334 | Green | June 5, 1951 |
| 2,592,486 | Stark | Apr. 8, 1952 |
| 2,592,487 | Stark | Apr. 8, 1952 |

FOREIGN PATENTS

| Number | Country | Date |
|---|---|---|
| 288,716 | Germany | Nov. 13, 1915 |